United States Patent [19]
Liva et al.

[11] Patent Number: 5,680,239
[45] Date of Patent: Oct. 21, 1997

[54] FIBER OPTIC MULTIPLEXER AND DEMULTIPLEXER SYSTEM

[75] Inventors: Michael Liva, Wayne; Steve Angermund, Bloomingdale; Farooq Khan, Newark, all of N.J.

[73] Assignee: Pro-Optical Technologies, Inc., Maplewood, N.J.

[21] Appl. No.: 213,048

[22] Filed: Mar. 14, 1994

[51] Int. Cl.[6] ................................................ H04J 14/08
[52] U.S. Cl. .................. 395/143; 359/135; 359/144; 359/168
[58] Field of Search .................. 359/135, 138, 359/139, 143, 144, 168, 115, 118

[56] References Cited

U.S. PATENT DOCUMENTS

| | | | |
|---|---|---|---|
| 3,849,604 | 11/1974 | Benes et al. | 359/138 |
| 4,302,835 | 11/1981 | McMahon | 359/138 |
| 4,546,466 | 10/1985 | Lopiccolo | 370/3 |
| 4,945,531 | 7/1990 | Suzuki | 359/176 |
| 4,964,727 | 10/1990 | Huggins | 356/373 |
| 5,111,323 | 5/1992 | Tanaka et al. | 359/139 |
| 5,208,691 | 5/1993 | Nishio | 359/135 |
| 5,224,183 | 6/1993 | Dugan | 359/115 |
| 5,237,171 | 8/1993 | Liva et al. | 250/227.1 |
| 5,333,088 | 7/1994 | Sweet | 359/144 |

FOREIGN PATENT DOCUMENTS 3825098 7/1989 Germany.

OTHER PUBLICATIONS

I/O: Smarter and more talkative by Peter Cleaveland I & C S—Dec., 1993.

Primary Examiner—Leslie Pascal
Attorney, Agent, or Firm—Volpe and Koenig, P.C.

[57] ABSTRACT

A fiber optic multiplexer and demultiplexer system uses programmable controllers to coordinate the acquisition of switch and sensor state information, to control fiber optic sources, to control fiber optic detectors, to format output, and to perform all timing functions and error correction. The system includes a multiplexer which has an input interface that presents groups of one-bit state information to a storage latch, the number of latches depends on the number of states to be transmitted. A programmable controller selects each latch, reads the state information and drives an optical source to send the information in a multiplexed format. The system also includes a demultiplexer which has a programmable controller that monitors an optical detector for an incoming optical signal. The controller decodes the signal, checks the data for errors, and sends the data to the proper output storage latch.

9 Claims, 11 Drawing Sheets

FIBER OPTIC MULTIPLEXER AND DEMULTIPLEXER SYSTEM

This invention relates generally to fiber optic systems and components. More specifically, it pertains to a fiber optic multiplexer and demultiplexer system for sensor and switch state information.

BACKGROUND OF THE INVENTION

A typical control system for a subject process includes a plurality of input devices, a central processor and a plurality of output devices. The input devices gather data information on the process being controlled and transmit the data to the processor. The processor receives the data, analyses it in accordance with a set of pre-programmed instructions, and provides an output signal to the output devices. The output devices, upon receipt of a signal from the processor, act in some manner to modify the subject process. The accurate collection and transmission of data by the input devices are critical to ensuring that the process is closely monitored and kept within acceptable tolerances.

One-bit sensor and switch state information is one type of data input that has been used for some time in various control systems. Typically, the data generated represents the occurrence of an event, such as when a package on a conveyor has arrived at a predetermined location or a switch has been actuated by an operator. The control system, having received data from the switching, may cause a change in the process; e.g. stop the conveyor or turn on a light. As processes have become more complex, and tolerances on those processes more exacting, control systems have become larger and more complicated. Accordingly, the sensor and switch state information may have to travel considerable distance to reach the central processor.

In order to alleviate problems with the increasing complexity of the systems and distances of data transmission, several methods have been used. Conventionally, sensors and switches are individually hardwired into the control system. This can be prohibitively expensive and may pose maintenance and troubleshooting difficulties, particularly when the system contains a large number of remote sensors and switches.

Another approach is to use remote input/output (I/O) panels. These panels serve as remote nodes in a computer network of the control system, enabling large amounts of sensor and switch state data to be transmitted over the network. One disadvantage, however, is that the cost of the network escalates quickly as sensors and switches are distributed over greater distances.

A third approach has been to multiplex and demultiplex the data. Multiplexing takes large amounts of data, transmits the data and reproduces it at the demultiplexed end. The transmission typically is performed over a small number of wires. The savings in cost can be considerable since wiring installation costs are dramatically reduced.

The prior art methods for transmitting sensor and switch state information rely on electrical technology and its associated problems. These problems include electro-magnetic interference (EMI) and radio frequency interference (RFI), expensive National Electric Code requirements for installation, and relatively slow speed of operation.

The disclosed invention eliminates these problems by using fiber optics instead of wire to transmit the sensor and switch state data. Optical signals are not subject to EMI or RFI interference. Since fiber optic cables do not carry current or contain conductors, NEC installation requirements are substantially reduced and safety concerns are minimized. Further, fiber optic systems can operate at much higher speeds than electrical systems. While fiber optic links for telecommunication and data communication exist, their inherent high bandwidth properties are wasted on this application. Accordingly, they are too expensive for transmitting sensor and switch state data.

SUMMARY OF THE INVENTION

The present invention provides an optical multiplexing system using programmable controllers to coordinate the acquisition of switch and sensor state information, control fiber optic sources, control fiber optic detectors, format output, and perform all timing functions and error correction.

The system includes a multiplexer which has an input interface that presents groups of one-bit state information to a storage latch, the number of latches depends on the number of states to be transmitted. A programmable controller selects each latch, reads the state information and drives an optical source to send the information in a multiplexed format.

The system includes a demultiplexer which has a programmable controller that monitors an optical detector for an incoming optical signal. The controller decodes the signal, checks the data for errors, and sends the data to the proper output storage latch.

Since the invention utilizes software to perform many of the functions of the system, a relatively few number of discrete components are used as compared to prior art designs, resulting in significant cost savings.

Other objects and advantages of the present invention will be apparent to those of ordinary skill in the art from the following description of a presently preferred embodiment.

DESCRIPTION OF A PREFERRED EMBODIMENT

Figure 1:
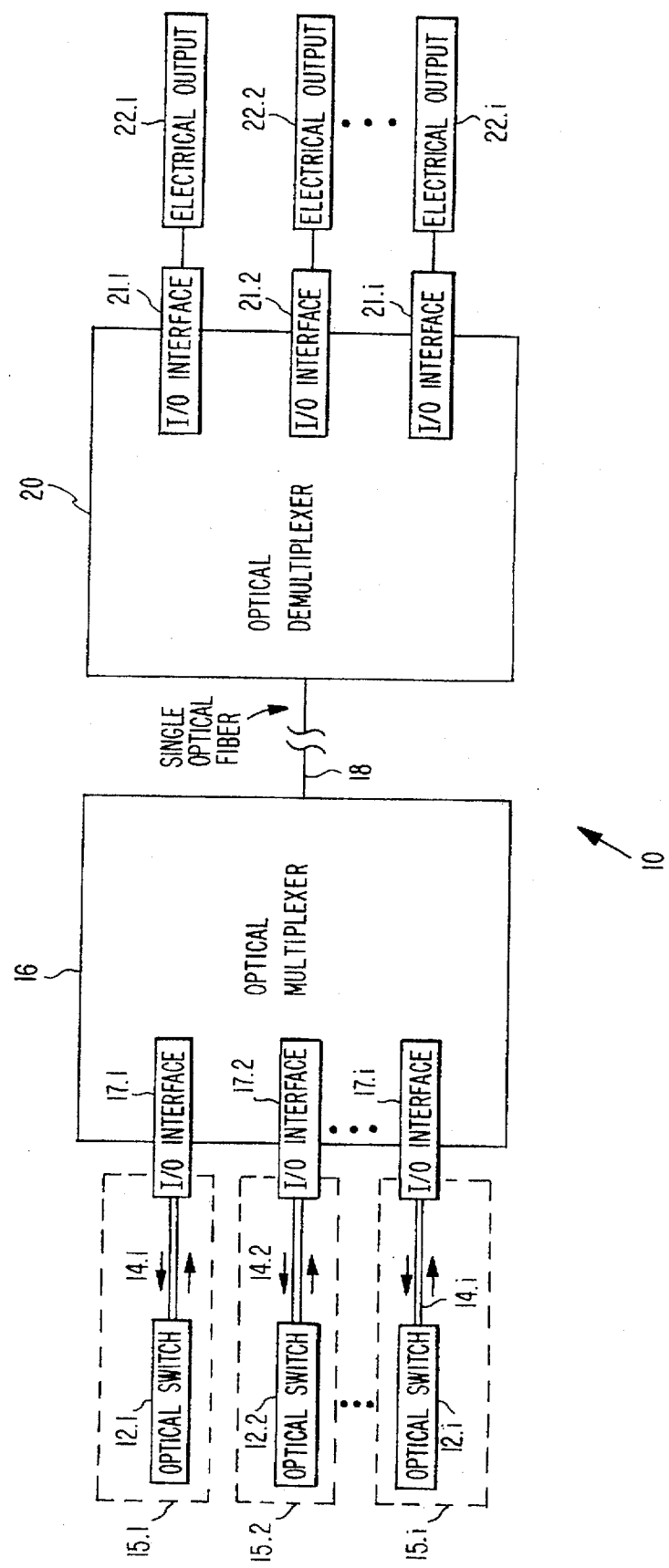
FIG. 1 is a block diagram of a multiple channel fiber optic multiplexer and demultiplexer system.

Referring to FIG. 1, a multiple channel fiber optic multiplexer and demultiplexer system 10 is shown. The fiber optic system 10 comprises a plurality of optical devices 12.1, 12.2 . . . 12.i, such as optical switches, a plurality of optical fiber pairs 14.1, 14.2 . . . 14.i, a plurality of I/O interfaces 17.1, 17.2 . . . 17.i, an optical multiplexer 16, a single optical fiber 18, an optical demultiplexer 20, a second plurality of I/O interfaces 21.1, 21.2 . . . 21.i, and a plurality of electrical outputs 22.1 , 22.2 . . . 22.i. Each optical device 12.1, 12.2 . . . 12.i and associated optical fiber pair 14.1, 14.2 . . . 14.i comprises a single channel optical circuit 15.1, 15.2 . . . 15.i. The fiber optic system 10 is designed to handle a plurality of channels. In the preferred embodiment, the system multiplexes and demultiplexes 64 channels and accordingly, up to 64 separate single channel optic devices can be operated via the system 10.

Each optical device 12.1, 12.2 . . . 12.i is coupled to the optical multiplexer 16 via an optical fiber pair 14.1, 14.2 . . . 14.i. Various optical devices can be driven, for example, switches, thermostats, or position sensors. For convenience, the system 10 is described coupled to optical switch circuits. The lengths of the optical fiber pairs 14.1, 14.2 . . . 14.i may vary depending upon the actual physical location of the switch 12.1, 12.2 . . . 12.i in relation to the multiplexer 16. The single bit data signal relating to the state (on or off) of an optical switch 12.1, 12.2 . . . 12.i is transmitted over the optical fiber pair 14.1, 14.2 . . . 14.i, through an I/O interface 17.1, 17.2 . . . 17.i to the optical multiplexer 16. The I/O interface 17.1, 17.2 . . . 17.i typically comprises a pair of fiber optic connectors or a single connector capable of connecting a pair of optic fibers.

The optical multiplexer 16 multiplexes the data signals into a predetermined format, and transmits the data via a multiplexed optical signal to an optical demultiplexer 20 over a single optical fiber 18. The optical demultiplexer 20 receives the formatted data signal, demultiplexes the signal and sends the data to a plurality of I/O interfaces 21.1, 21.2 . . . 21.i, which are coupled to a plurality of electrical outputs 22.1, 22.2 . . . 22.i. The type of output interface 21.1, 21.2 . . . 21.i depends on the type of electrical output 22.1, 22.2 . . . 22.i to be coupled with. For example, the electrical output could be a graphical display or the input to a logic system.

Figure 2:
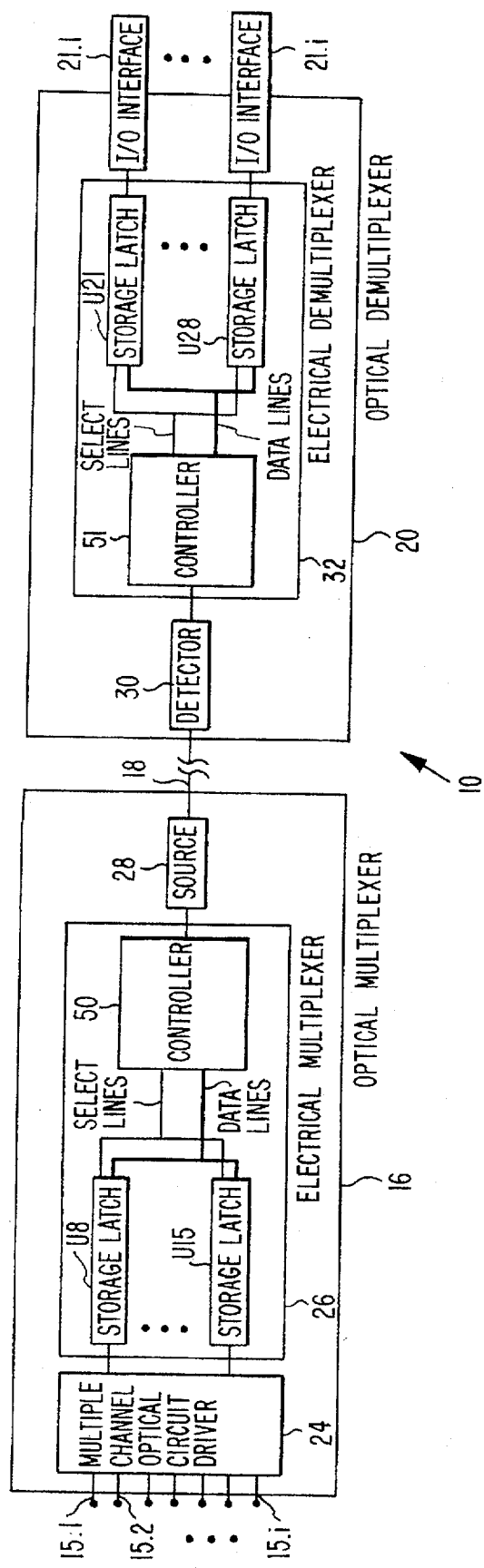
FIG. 2 is a detailed block diagram of the multiple channel fiber optic multiplexer and demultiplexer system of FIG. 1.

A more detailed block diagram of the fiber optic system 10 is shown in FIG. 2. The optical multiplexer 16 comprises a multiple channel optical circuit driver 24, an electrical multiplexer 26, and an optical source 28. The multiple channel optical circuit driver 24 detects and converts the optical data signals received on each channel 15.1, 15.2 . . . 15.i to electrical data signals.

Figure 3:
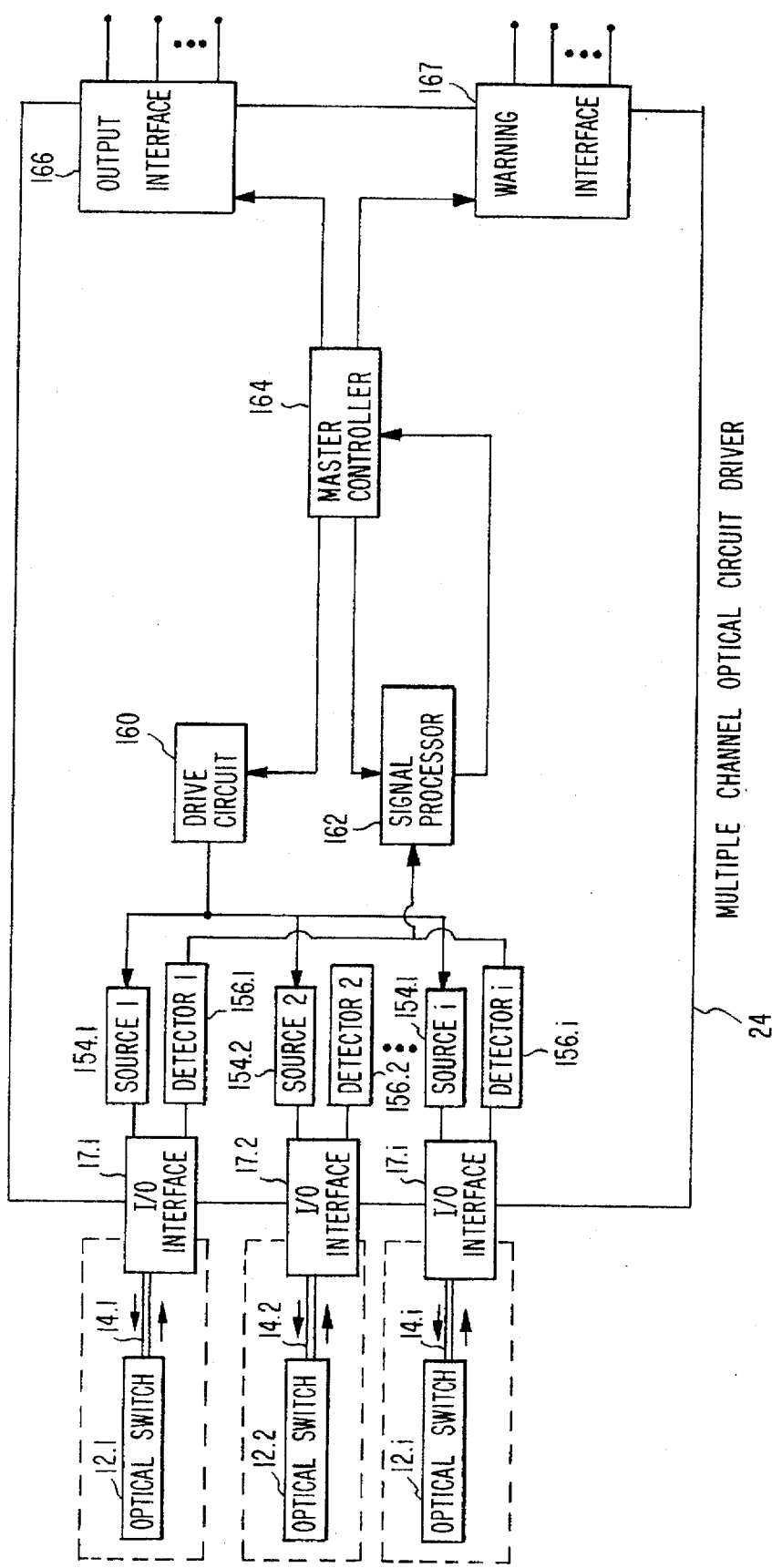
FIG. 3 is a block diagram of a multiple channel optical circuit driver.

Although the fiber optic system 10 is capable of receiving a plurality of single channel optical inputs, the preferred embodiment utilizes a multiple channel optical circuit driver 24. A more detailed block diagram of the multiple channel optical circuit driver 24 is shown in FIG. 3. The preferred embodiment is capable of driving up to 64 channels, although the number of channels may vary according to the requirements of the specific application. The optical driver 24 comprises an optical source 154.1, 154.2 . . . 154.i, an optical detector 156.1, 156.2 . . . 156.i, and an input/output (I/O) interface 17.1, 17.2 . . . 17.i, for each channel 15.1, 15.2 . . . 15.i which are collectively coupled to a drive circuit 160, a signal processor 162, a master controller 164, a data output interface 166, and a warning interface 167. In the preferred embodiment, separate optical emitting sources 154.1, 154.2 . . . 154.i and separate detectors 156.1, 156.2 . . . 156.i are provided for each channel 15.1, 15.2 . . . 15.i. However, optical sources and optical detectors serving multiple channels could be employed in an arrangement such that each channel is served by a different pairing of optical source and optical detector.

Each source 154.1, 154.2 . . . 154.i and associated detector 156.1, 156.2 . . . 156.i are coupled to an optical switch 12.1, 12.2 . . . 12.i via an I/O interface 17.1, 17.2 . . . 17.i and a fiber optic pair 14.1, 14.2 . . . 14.i. The master controller 164 coordinates the operation of the drive circuit 160 and the signal processor 162. The master controller 164, selects the channel 15.1, 15.2 . . . 15.i to be driven and monitored. In response to the master controller 164, the drive circuit 160 energizes a source 154.1, 154.2 . . . 154.i which emits light, and the signal processor 162 activates the associated detector 156.1, 156.2 . . . 156.i to detect the presence or absence of a return of at least a portion of the emitted light.

An optical data signal is generated in the following manner. The light emitted from the optical source 154.1, 154.2 . . . 154.i travels through the I/O interface 17.1, 17.2 . . . 17.i, and through the first fiber of the optical fiber pair 14.1, 14.2 . . . 14.i, to the optical switch 12.1, 12.2 . . . 12.i. If the switch 12.1, 12.2 . . . 12.i is in the open position, no light that was emitted from the source 154.1, 154.2 . . . 154.i will be returned to the detector 156.1, 156.2 . . . 156.i. If the switch 12.1, 12.2 . . . 12.i is in the closed position, the light will be reflected by the switch 12.1, 12.2 . . . 12.i and at least a portion of the light will return through the second fiber of the optical fiber pair 14.1, 14.2 . . . 14.i to the detector 156.1, 156.2 . . . 156.i. The detection of an absence or presence of returned light at the detector 156.1, 156.2 . . . 156.i comprises the optical data signal indicative of the state (ON or OFF) of the optical switch 12.1, 12.2 . . . 12.i. The absence or presence of light at the detector could be created mechanically by the optical device, such as by the depression of a pushbutton switch which interrupts the light path, or reflectively by an object on a conveyor belt which reflects the emitted light signal or breaks the path of the light beam as it passes the sensor.

A detector 156.1, 156.2 . . . 156.i may erroneously detect ambient light, or noise, as the presence of returned light emitted by the source 154.1, 154.2 . . . 154.i. Therefore, the fiber optic system 10 includes means to subtract out the noise generated by ambient light sources. Also, a minimum signal threshold level is established in order for the detected light to be considered a valid signal.

If the detector 156., 156.2 . . . 156.i detects a light signal at the minimum threshold level, the state (on or off) of the channel 15.1, 15.2 . . . 15.i is considered to be ON. However, if the detected light signal does not achieve the minimum threshold level, the state of the channel 15.1, 5.2 . . . 5.i is considered to be OFF. In order to ensure that the state of each channel 15.1, 15.2 . . . 15.i is properly detected, each detector 156.1, 156.2 . . . 156.i must be activated while its associated source 154.1, 154.2 . . . 154.i is energized. Once the state of the channel 15.1, 15.2 . . . 15.i is obtained, it is stored in an output interface 166.

Figure 4:
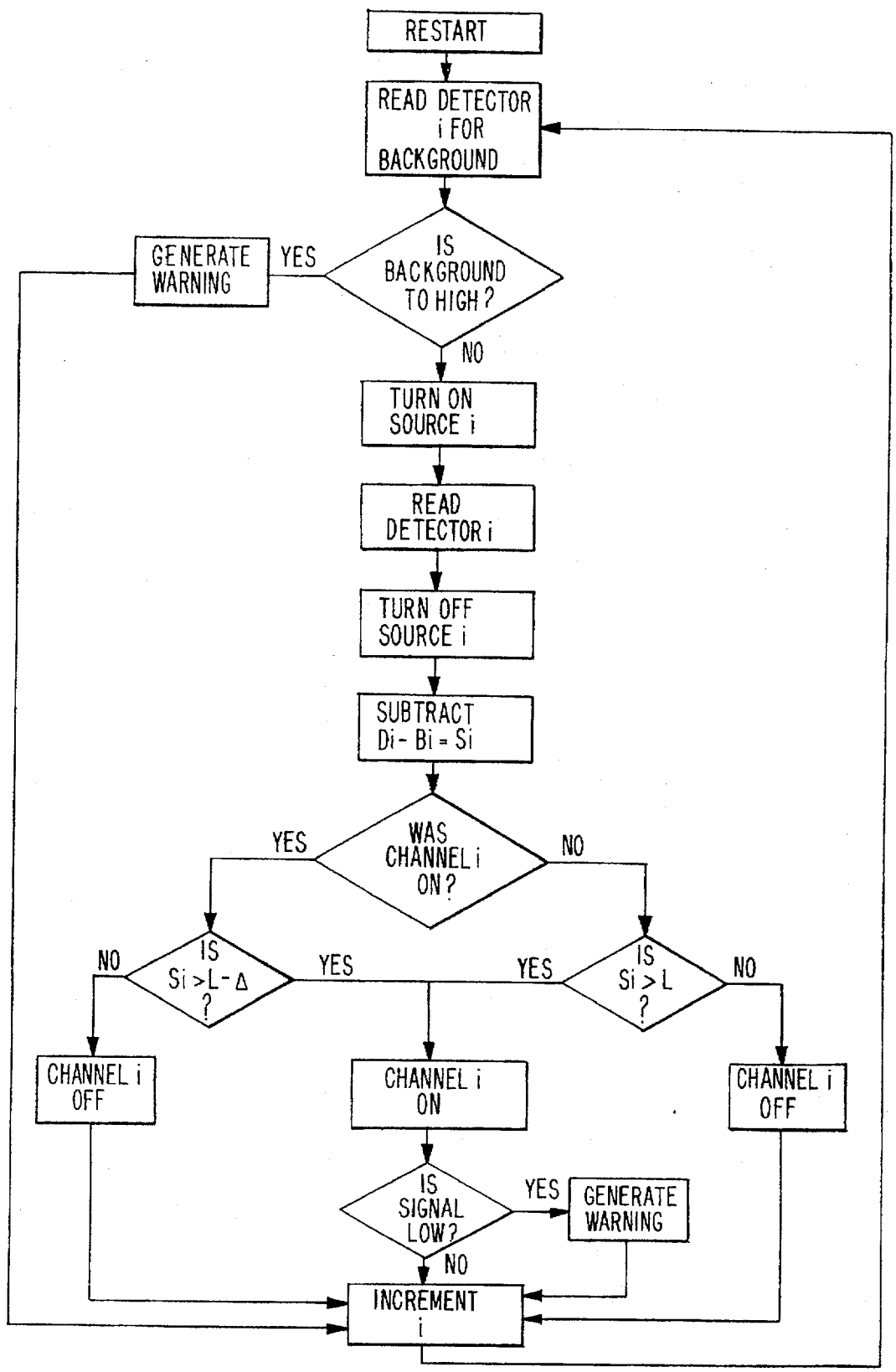
FIG. 4 is a flowchart of the process utilized by the multiple channel optical circuit driver to detect channel states.

The process utilized by the master controller 164 is shown in detail in FIG. 4. After the channel latch count is initialized, the master controller 164 selects the first channel 15.1. The detector 156.1 associated with the selected channel 15.1 is activated for a predetermined duration to read the background noise level. If the background noise level is too high, the master controller 164 generates a first warning signal. This warning signal is output to a warning interface 167. The drive circuit 160 energizes a source 154.1, 154.2 . . . 154.i associated with the selected channel 15.1, 15.2 . . . 15.i, and the signal processor 162 activates the associated detector 156.1, 156.2 . . . 156.i. The optical data signal detected by the detector 156.1, 156.2 . . . 156.*i* is a combination of the signal relating to the state of the channel 15.1, 15.2 . . . 15.*i* and the background noise level. The master controller 164 subtracts out the background noise to obtain the signal relating to the state of the channel 15.1, 15.2 . . . 15.*i*. In the preferred embodiment, background compensation is sufficient to allow standard fiber optic coupled retroreflective sensors to operate in 10,000 lux of ambient light.

The master controller 164 considers the history of the state of the channel as an aid in locking onto signals and providing cleaner switching. For example, if the strength of a signal detected on a channel 15.1, 15.2 . . . 15.*i* exceeds an initial predetermined ON threshold level, the channel 15.1, 15.2 . . . 15.*i* is considered to be ON. The next time the channel 15.1, 15.2 . . . 15.*i* is read, the master controller 164 will consider the channel 15.1, 15.2 . . . 15.*i* to be ON if the signal strength is greater than a "low signal" threshold which is less than the initial predetermined ON threshold level. This process is shown in FIG. 4.

Preferably, the initial ON threshold level is set at 25 nW and the "low signal" ON threshold level is set at 15 nW. If a channel 15.1, 15.2 . . . 15.*i* was previously ON, and the signal strength is greater than 15 nW, the channel 15.1, 15.2 . . . 15.*i* will still be considered ON. If the received signal is less than 15 nW, the channel 15.1, 15.2 . . . 15.*i* will be considered OFF. If, however, the channel 15.1, 15.2 . . . 15.*i* was previously OFF, the received signal strength must reach the ON threshold level of 25 nW to consider the channel 15.1, 15.2 . . . 15.*i* ON. This "locking on" feature ensures clean positive switching even if the signal-to-noise ratio is low. This process is explained with reference to the multiple channel optical circuit driver 24, however, this can also be utilized with a single channel device.

Although a channel 15.1, 15.2 . . . 15.*i* is considered ON when a signal is received at 25 nW, the master controller 164 will generate a second warning signal for that channel 15.1, 15.2 . . . 15.*i* when the signal strength drops below a warning threshold, preferably 75 nW. This warning signal is output to the warning interface 167. When the master controller 164 determines that a valid signal has been obtained, the master controller 164 stores the data, increments the channel latch count, and proceeds to read the state of the succeeding channel 15.2 . . . 15.*i*.

Figure 5:
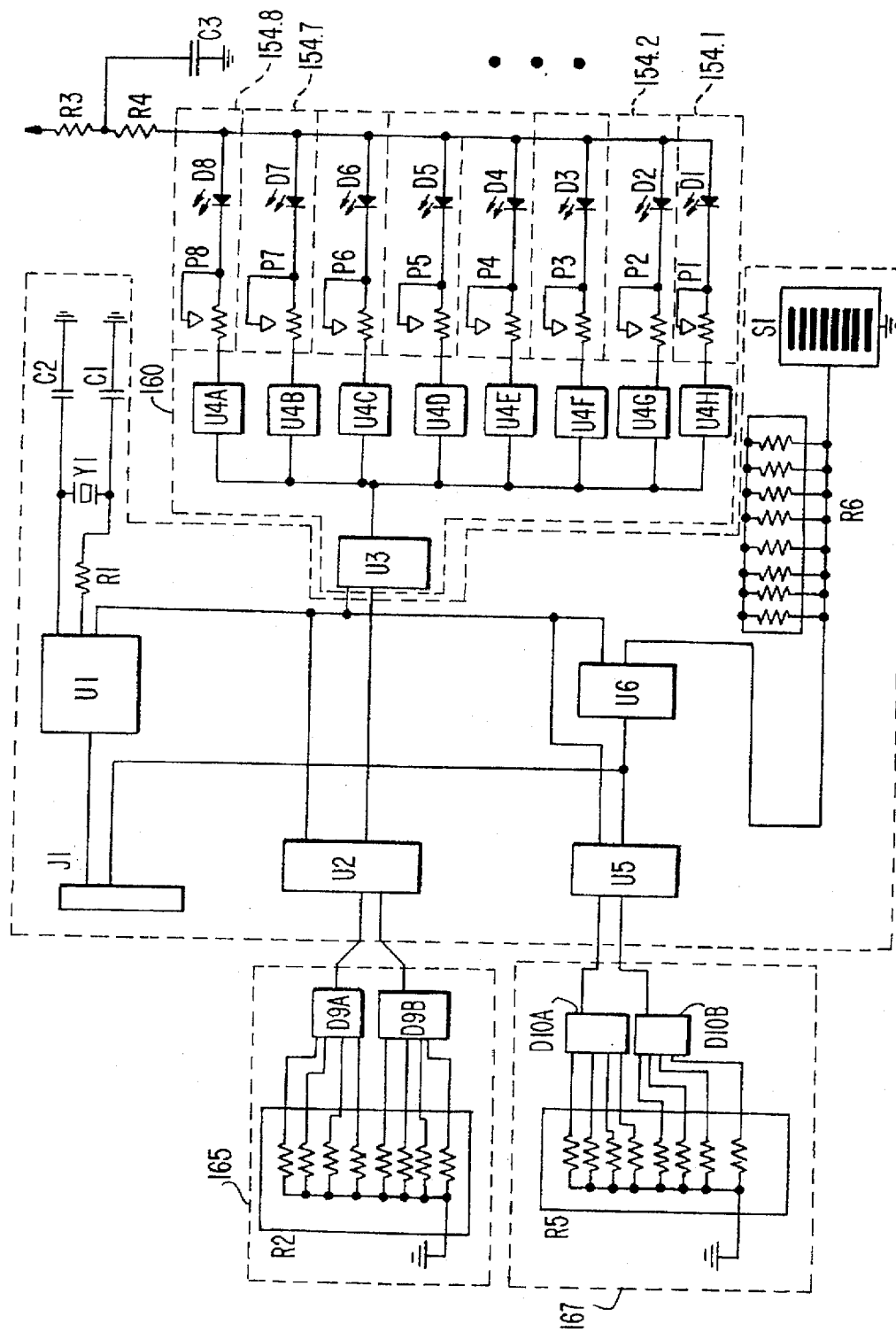
FIG. 5 is a schematic diagram of the multiple channel optical circuit driver.

Once all channels 15.1, 15.2 . . . 15.*i* have been read by the master controller 64, the state of each channel 15.1, 15.2 . . . 15.*i* is displayed on the LED bargraph 165 as shown in the schematic of FIG. 5 and output to the output interface 166 (not shown). Warning signals are also displayed on a separate set of LED bargraphs 167.

Operation of the multiple channel optical circuit driver 24 is explained with reference to FIGS. 5 and 6. The master controller 164 includes a microprocessor U1 which sends address information to the signal processor 162 shown in FIG. 6. The signal processor 162 selects the detector 156.1, 156.2 . . . 156.*i* associated with the selected channel 15.1, 15.2 . . . 15.*i* and the background noise level for the selected channel 15.1, 15.2 . . . 15.*i* is detected, amplified and sent to the microprocessor U1. The microprocessor U1 then transmits the address information of the channel 15.1, 15.2 . . . 15.*i* to the drive circuit 160 and the selected source 154.1, 154.2 . . . 154.*i* is energized to emit a beam of light. The detector 156., 156.2 . . . 156.*i* is again activated to detect the reflected light signal from the selected channel 5.1, 5.2 . . . 15.*i*. This information is transmitted to the microprocessor U1 for processing in accordance with the process shown in FIG. 4.

Examples of the various electrical elements depicted in the schematic of FIG. 5 are given in Table 3, below:

| Item | Value |
| --- | --- |
| C1,C2 | 15 pF |
| C3 | 100 uF |
| R1 | 100Ω |
| R2,R5 | 330Ω |
| R3 | 6.2Ω |
| R4 | 16Ω |
| R6 | 10.0 KΩ |
| J1 | CONNECTOR |
| D1,D2,D3,D4,D5,D6,D7,D8 | LED |
| P1,P2,P3,P4,P5,P6,P7,P8 | POTENTIOMETER |
| U1 | PIC16C55 |
| U2,U3,U5,U6 | 74HC573 |
| U4 | ULN2801 |
| Y1 | CRYSTAL |
| S1 | DIP SWITCH |
| D9,D10 | LED BAR GRAPH |

Figure 6:
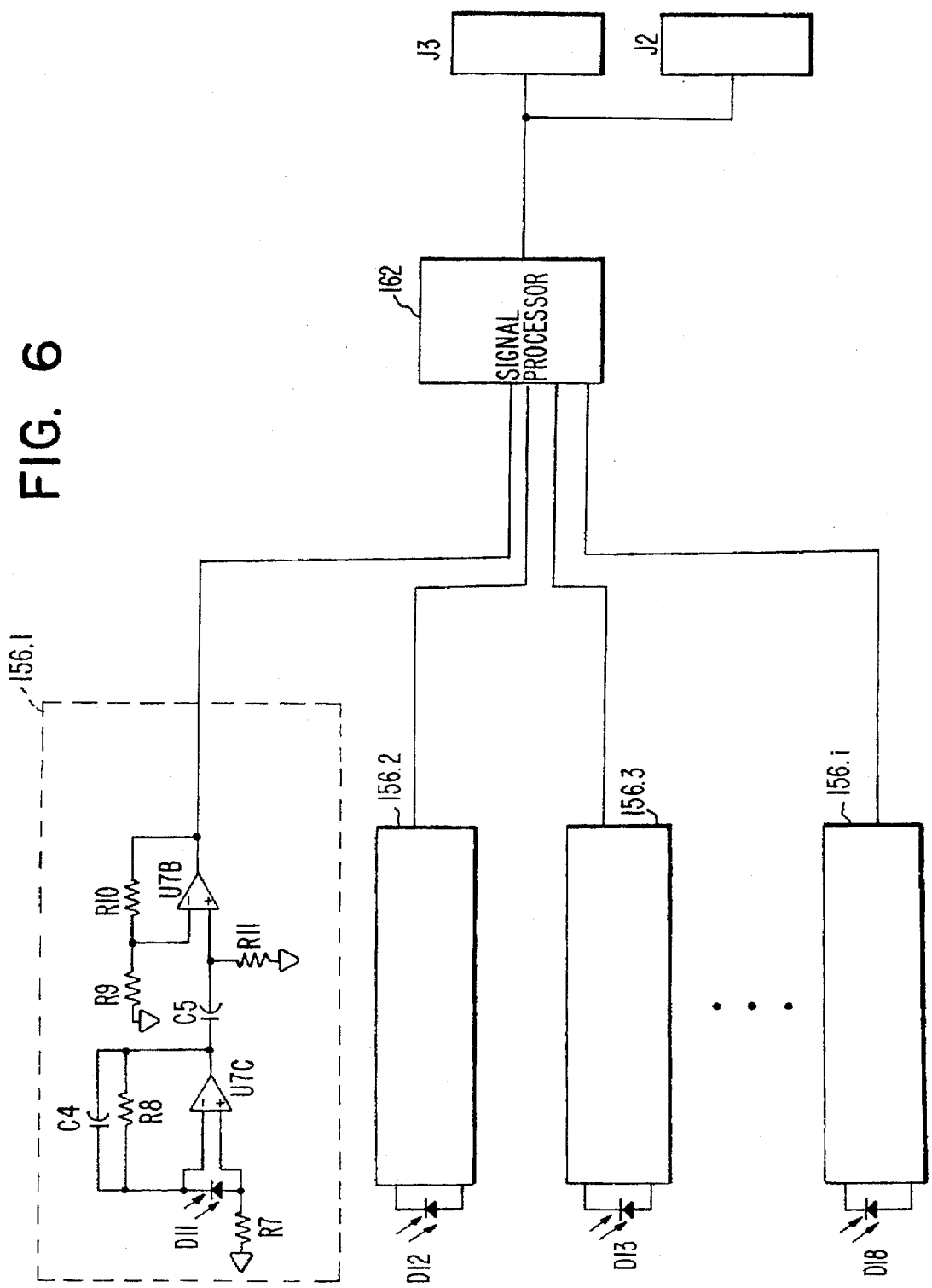
FIG. 6 is a schematic diagram of the optical signal processor and detectors.

Examples of the various electrical elements depicted in the schematic of FIG. 6 are given in Table 4, below:

| Item | Value |
| --- | --- |
| C4 | 5 pF |
| C5 | .01 uF |
| R7,R8 | 1.0 MΩ |
| R9 | 20.0 KΩ |
| R10 | 158 KΩ |
| R11 | 10.0 KΩ |
| D11,D12,D13,D14,D15,D16,D17,D18 | PHOTODIODE |
| J2 | CONNECTOR |
| J3 | CONNECTOR |
| U7 | TLC274BCN |
| 162 | MAX158BCPI |

The program in the microprocessor U1 has the ability to detect, process, and output the states of eight channels in less than 800 µs. The multiple channel optical circuit driver 24 is coupled to an electrical multiplexer 26 as shown in FIG. 2 which multiplexes the data signals into a predetermined format. The multiplexed data signals are converted back to an optical data signal by the optical source 28, for transmission over the single optical fiber The optical demultiplexer 20 comprises an optical detector 30 coupled to an electrical demultiplexer 32. The optical detector 30 detects and converts the optical data signals into electrical signals. These electrical data signals are then demultiplexed by the electrical demultiplexer 32 and outputted to the output interfaces 21.1, 21.2 . . . 21.*i*.

Significant savings in cost and complexity are realized by the use of programmable controllers 50, 51 in the optical multiplexer 16 and optical demultiplexer 20. Many of the functions performed by discrete components in prior art systems are performed by programmable controllers 50, 51 in the present invention. Accordingly, relatively few components are utilized as compared to previous designs.

Figure 7:
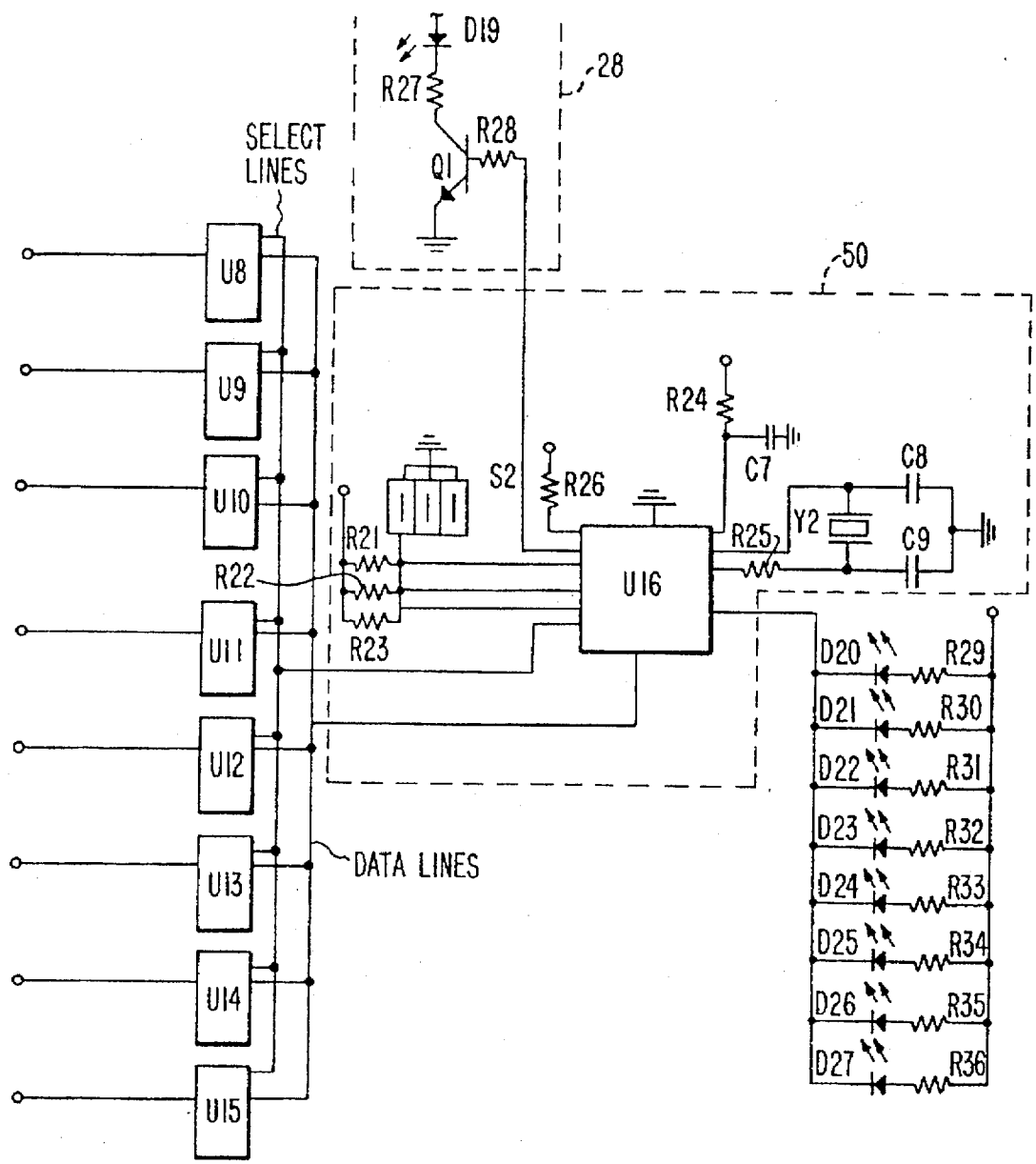
FIG. 7 is a schematic diagram of the optical multiplexer.
Figure 8:
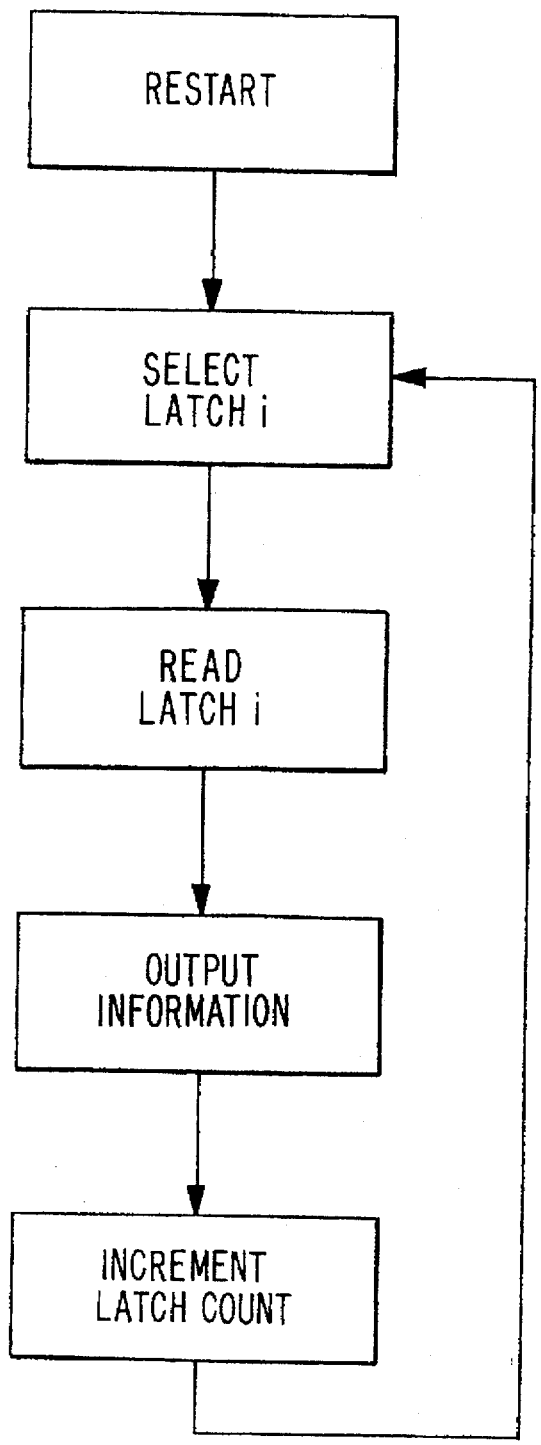
FIG. 8 is a flowchart of the process utilized by the optical multiplexer to access the information stored in the latches.

A schematic diagram of the optical multiplexer 16 is shown in FIG. 7. The data associated with each channel 15.1, 15.2 . . . 15.*i* is stored in a predetermined position among a plurality of latches U8, U9, U10, U11, U12, U13, U14, U15. The programmable controller 50 includes a microprocessor U16 that sequentially accesses each latch U8, U9, U10, U11, U12, U13, U14, U15 on the select line using the process displayed in FIG. 8. After the latch count is initialized, the microprocessor U16 selects the first latch U8 and reads the data contained in the latch U8. Each latch U8, U9, U10, U11, U12, U13, U14, U15 stores data pertaining to eight channels 15.1, 15.2 . . . 15.i. The data is multiplexed into a predetermined format by the microprocessor U16 and sent to the optical source 28 for transmission over the single optical fiber 18. The latch count is then incremented by one and the microprocessor U16 accesses the next latch U9 to read the data contained therein. This process is continually repeated during the operation of the optical system 10.

Referring to FIG. 7, the optical source 28 is an LED D19 which is coupled to the microprocessor U16. A plurality of LEDs D20, D21, D22, D23, D24, D25, D26, D27 each corresponding to a respective latch U8, U9, U10, U11, U12, U13, U14, U15 to indicate when the respective latch U8, U9, U10, U11, U12, U13, U14, U15 is being accessed by the microprocessor U16.

Examples of the various electrical elements depicted in the schematic of FIG. 7 are given in Table 3 below:

| Reference | Part Value |
| --- | --- |
| C7 | 1 uF |
| C8,C9 | 15 pF |
| D19,D20,D21,D22,D23,D24,D25,D26,D27 | LED |
| Q1 | 2N3904 |
| R21,R22,R23 | 10 KΩ |
| R24 | 1 KΩ |
| R25 | 500Ω |
| R26 | 1 MΩ |
| R27 | 60Ω |
| R28 | 3.9 KΩ |
| R29,R30,R31,R32,R33,R34,R35,R36 | 300Ω |
| S2 | SW DIP-3 |
| U8,U9,U10,U11,U12,U13,U14,U15 | 74LS373 |
| U16 | PIC16C55 |
| Y2 | CRYSTAL |

Figure 9:
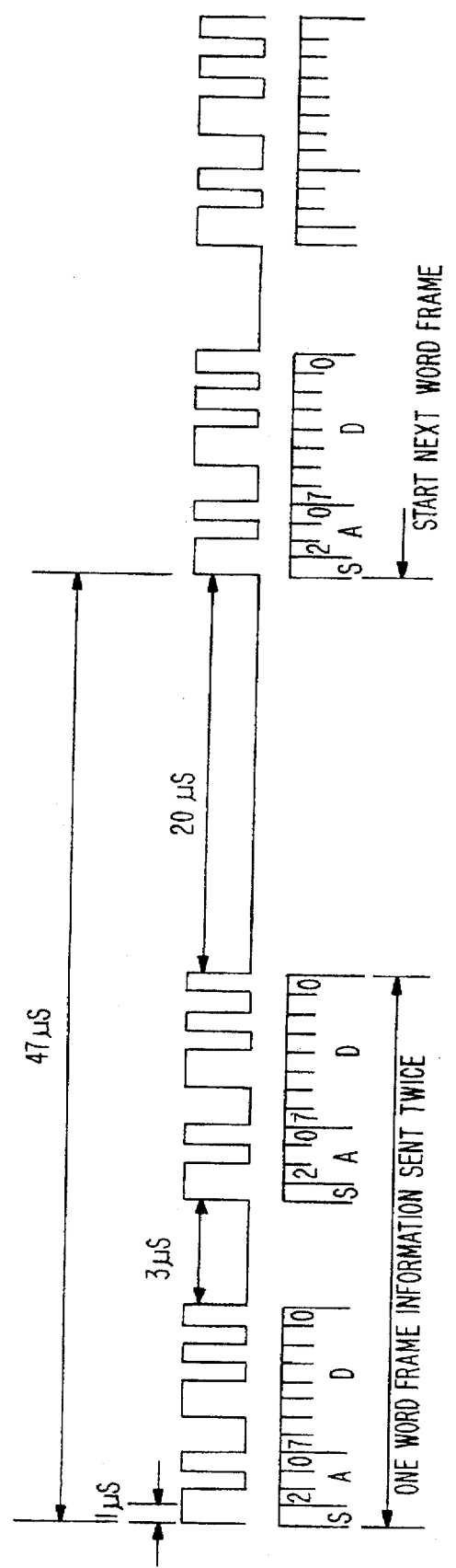
FIG. 9 is a graphical representation of the formatted signal transmitted by the optical multiplexer.

The format of the optical signal transmitted by the optical source 28 is shown in FIG. 9. The information consists of a start pulse, (indicated by S), a latch address identifier, (indicated by A), and the actual data relating to the states of eight channels, (indicated by D). The information is sent twice in each word frame for error detection by the demultiplexer 20.

In the preferred embodiment, the multiplexer 16 operates at a speed which is greater than the speed of the multiple channel optical circuit driver 24. This ensures that all sensing data detected by the sequencing of the optical driver 24 through the channels 15.1, 15.2 . . . 15.i is transmitted by the multiplexer 16.

Figure 10:
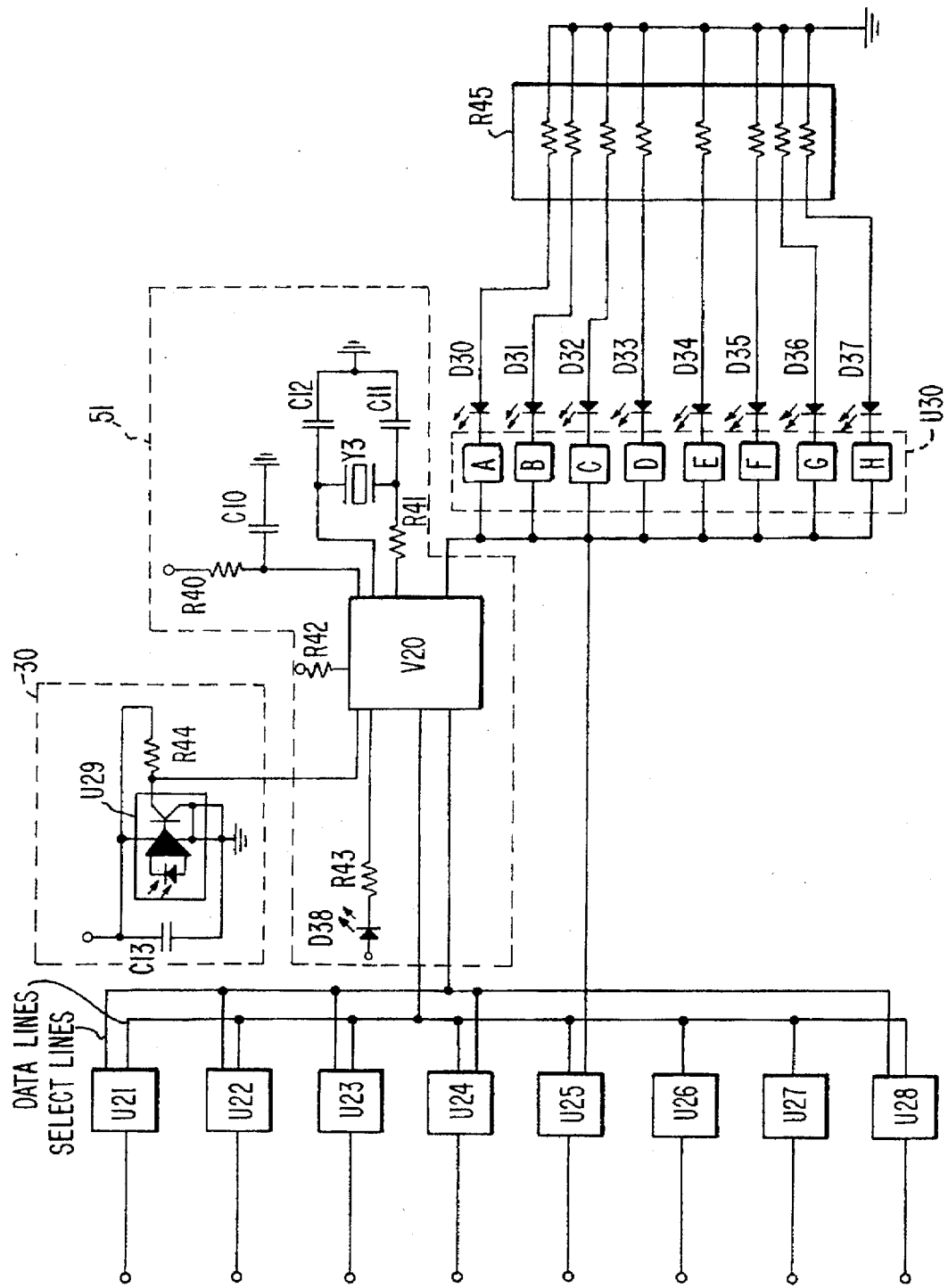
FIG. 10 is a schematic diagram of the optical demultiplexer.
Figure 11:
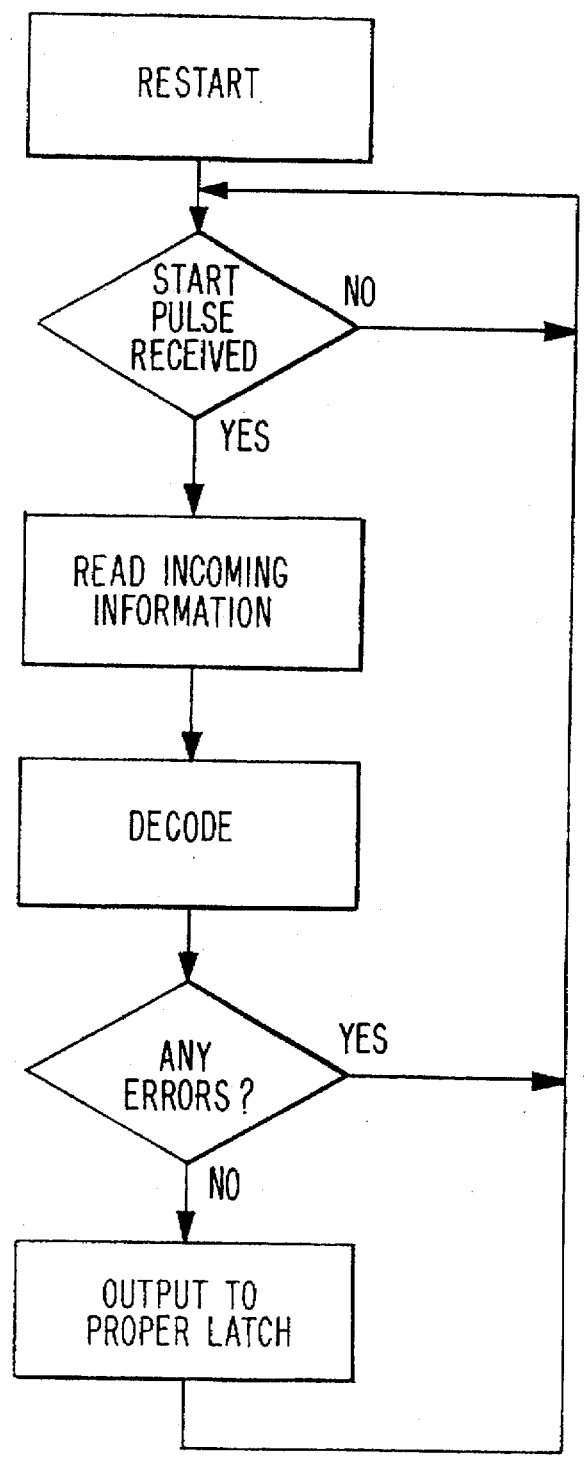
FIG. 11 is a flowchart of the process utilized by the optical demultiplexer to receive and decode information transmitted by the multiplexer.

A schematic diagram of the optical demultiplexer 20 is shown in FIG. 10. The demultiplexer 20 comprises an optical detector 30 coupled to an electrical demultiplexer 32. The optical detector 30 detects the optical signal transmitted from the optical multiplexer 16. The programmable controller 51 in the electrical demultiplexer 32 contains a microprocessor U20 monitors the optical detector 30 for a start pulse. The microprocessor U20 decodes the information contained in the optical signal by utilizing the process shown in FIG. 11. After a start pulse is detected by the optical detector 30, the microprocessor U20 reads the signal received from the optical detector 30 at precisely defined times. The microprocessor U20 demultiplexes and decodes the signal to determine the actual data (D), the address (A) of the output latch U21, U22, U23, U24, U25, U26, U27, U28 to which the data should be sent, and whether an error has occurred. In order for data to be considered valid, the microprocessor U20 must receive the data twice. If the data is determined to be valid, the microprocessor U20 sends the data to the specific output latch U21, U22, U23, U24, U25, U26, U27, U28. If data is not received twice, no information will be output to the specific latch U21, U22, U23, U24, U25, U26, U27, U28.

Examples of the various electrical elements depicted in the schematic of FIG. 10 are given in Table 4, below:

| Reference | Part Value |
| --- | --- |
| C10 | 1 uF |
| C11,C12 | 15 pF |
| C13 | .1 uF |
| D30,D31,D32,D33,D34,D35,D36,D37,D38 | LED |
| R40 | 1 KΩ |
| R41,R43 | 500Ω |
| R42 | 1 MΩ |
| R44 | 1 KΩ |
| R45 | 330Ω |
| U20 | PIC16C55 |
| U21,U22,U23,U24,U25,U26,U27,U28 | 75LS374 |
| U29 | HFD3023 |
| U30 | ULN2801 |
| Y3 | CRYSTAL |

A plurality of LEDs D30, D31, D32, D33, D34, D35, D36, D37 each corresponding to a respective latch U21, U22, U23, U24, U25, U26, U27, U28 to indicate when a data error for the respective latch U21, U22, U23, U24, U25, U26, U27, U28 has been detected by the microprocessor U20. The microprocessor U20, outputs a signal to a single LED D38 to indicate when a system failure has occurred.

The embodiment as described is able to multiplex, send and demultiplex 64 individual states in 400 μS through a length of fiber exceeding 1 Km.

The fiber optic system 0 is able to utilize moderate speed and still obtain a high throughput for the subject application. The embodiment as described is capable of a one megabit per second baud rate. After error checking and system overhead, the system 10 is capable of a throughput of 160K channels per second. This is the equivalent of the system being able to multiplex, transmit and demultiplex 64 individual states in 400 μs through a length of fiber exceeding 1 km.

We claim:

1. An optical multiplexer and demultiplexer system comprising:

a plurality of individual optical channels each having an optical input/output interface coupled to an optical sensor circuit via an optical fiber pair, such that each sensing circuit receives an optical signal from the optical output and provides sensing data to the associated optical input by either permitting or not permitting the return of at least a portion of the optical signal;

means for storing said sensing data;

a controller for selectively accessing said stored data and for electrically multiplexing said data into a time division multiplexed signal, said controller is electrically coupled to said sensing circuits;

light source means, responsive to said controller, for optically transmitting said multiplexed signal;

means for optically receiving said optical multiplexed signal and converting said optical multiplexed signal into an electrical signal; and means for demultiplexing said electrical signal to provide a plurality of electrical data signals.

2. The system of claim 1 wherein said optical sensor circuit comprises a single bit optical switch.

3. The system of claim 1 wherein said storing means comprises a plurality of storage latches and wherein said system further comprises a multiple optical circuit driver for generating said optical signal for said optical outputs, for receiving said sensing data, and for providing an output to said storing means.

4. The system of claim 3 wherein said light source means optically transmits said optical multiplexed signal over an optical fiber.

5. The system of claim 1 wherein said time division multiplexed signal includes a series of repeating frames, each said frame having at least a start pulse, a latch address identifier, and data bits relating to the states of said optical sensor circuits.

6. The system of claim 5 wherein said start pulse, said latch address identifier, and said data bits are transmitted twice for error detection.

7. An optical multiplexer and demultiplexer system comprising:

a plurality of individual optical channels each having an optical input/output interface for connection to an optical sensor circuit such that said sensor circuit provides single bit optical sensing data to the input/output interface;

means for storing said sensing data;

a controller for selectively processing said stored data and for multiplexing said data into a time division multiplexed signal;

light source means, responsive to said controller, for optically transmitting said multiplexed signal;

means for optically receiving and converting said optical multiplexed signal into an electrical signal; and means for demultiplexing said electrical signal to provide a plurality of electrical data signals.

8. The system of claim 7 wherein said sensor circuit comprises a single bit optical switch.

9. The system of claim 7 wherein each said optical input/output interface is connected to said sensor circuit via an optical fiber pair.

* * * * *